(12) United States Patent
Kuang et al.

(10) Patent No.: US 8,115,402 B2
(45) Date of Patent: Feb. 14, 2012

(54) METHOD AND APPARATUS FOR DRIVING MULTIPLE PARALLEL DISCHARGE LAMPS

(75) Inventors: Naixing Kuang, Hangzhou (CN); Lei Du, Hangzhou (CN); Junming Zhang, Hangzhou (CN); Yuancheng Ren, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 433 days.

(21) Appl. No.: 12/466,557

(22) Filed: May 15, 2009

(65) Prior Publication Data
US 2009/0284163 A1    Nov. 19, 2009

(30) Foreign Application Priority Data
May 15, 2008    (CN) .............. 2008 1 0099575

(51) Int. Cl.
H05B 41/36    (2006.01)

(52) U.S. Cl. .................. 315/209 R; 315/205; 315/219; 315/291; 315/302

(58) Field of Classification Search .............. 315/200 R, 315/201, 205, 209 R, 210, 219, 224, 291, 315/294, 302, 307
See application file for complete search history.

(56) References Cited

U.S. PATENT DOCUMENTS

| | | | | |
|---|---|---|---|---|
| 5,945,788 A * | 8/1999 | Li et al. | .......................... | 315/308 |
| 7,777,428 B2 * | 8/2010 | Kim et al. | .................... | 315/291 |
| 2004/0240235 A1 * | 12/2004 | Min | ............................... | 363/23 |
| 2005/0073266 A1 * | 4/2005 | Moyer et al. | .................. | 315/224 |
| 2005/0174818 A1 * | 8/2005 | Lin et al. | ......................... | 363/98 |
| 2008/0018262 A1 * | 1/2008 | Green | ............................ | 315/225 |

* cited by examiner

*Primary Examiner* — Jason M Crawford
(74) *Attorney, Agent, or Firm* — Perkins Coie LLP (57) ABSTRACT

The present invention provides a method and apparatus for driving multiple parallel discharge lamps, which increases the switching frequency once the open lamp condition is detected to provide an output voltage that is high enough to ignite the lamp again.

9 Claims, 6 Drawing Sheets

METHOD AND APPARATUS FOR DRIVING MULTIPLE PARALLEL DISCHARGE LAMPS

CROSS-REFERENCE TO RELATED APPLICATIONS

This application claims the benefit of Chinese Patent Application No. 200810099575.8, filed on May 15, 2008, which is incorporated herein by reference in its entirety.

TECHNICAL FIELD

The present invention generally relates to a switching circuit, and more particularly, relates to a method and apparatus for driving discharge lamps.

BACKGROUND

Discharge lamps, such as cold cathode fluorescent lamps (CCFL) and external electrode fluorescent lamps (EEFL), are widely used to backlight liquid crystal displays (LCD). Until the CCFL is struck or ignited, it will not conduct current with an applied terminal voltage that is less than a striking voltage, e.g., the terminal voltage must be equal to or greater than the striking voltage (for example, 1500 Volts). Once an electrical arc is struck inside the CCFL, the terminal voltage may fall to an operating voltage that is approximately ⅓ of the striking voltage over a relatively wide range of input current. A driving apparatus is needed to provide an alternating current (AC) driving voltage and stable lamp current at a high frequency for the CCFL. Generally, the driving apparatus comprises a control circuit, a switching circuit, a transformer and a resonant circuit.

Figure 1:
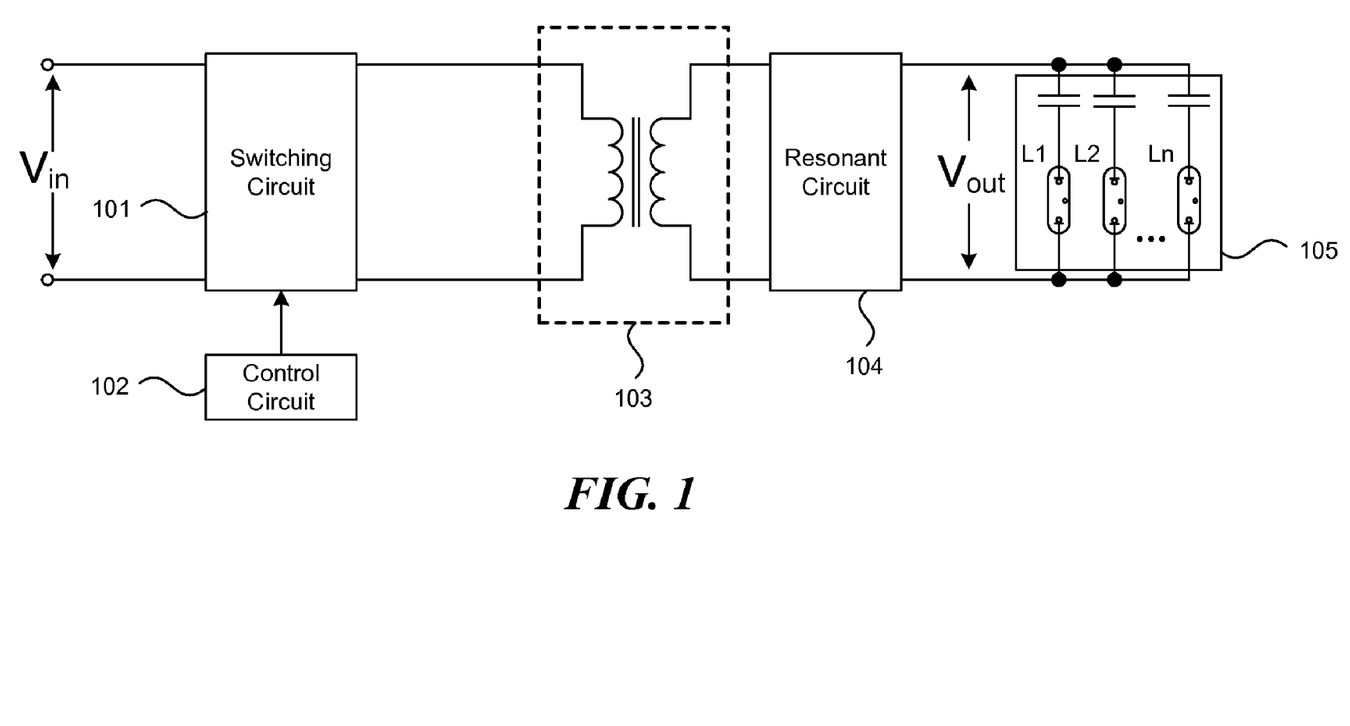
FIG. 1 is a block diagram of a prior art apparatus for driving multiple parallel discharge lamps.

As LCD's have increased in size and popularity, multiple discharge lamps are needed as a backlight. FIG. 1 is a block diagram of a prior art apparatus for driving multiple parallel discharge lamps, comprising a switching circuit 101, a control circuit 102, a transformer 103, a resonant circuit 104 and a load 105. The load 105 comprises n parallel discharge lamps, and n capacitors each of which is serially connected to one discharge lamp to balance the lamp current, wherein n is a positive integer. This current balance technology is called a capacitor balance, and the capacitor is called a ballast capacitor. In normal operation, the terminal voltage of each discharge lamp is the voltage across the ballast capacitor subtracted from the output voltage $V_{out}$ of the driving apparatus. Under an open lamp condition, since there is no current flowing through the open discharge lamp, the terminal voltage is exactly the output voltage $V_{out}$ of the driving apparatus.

Figure 2:
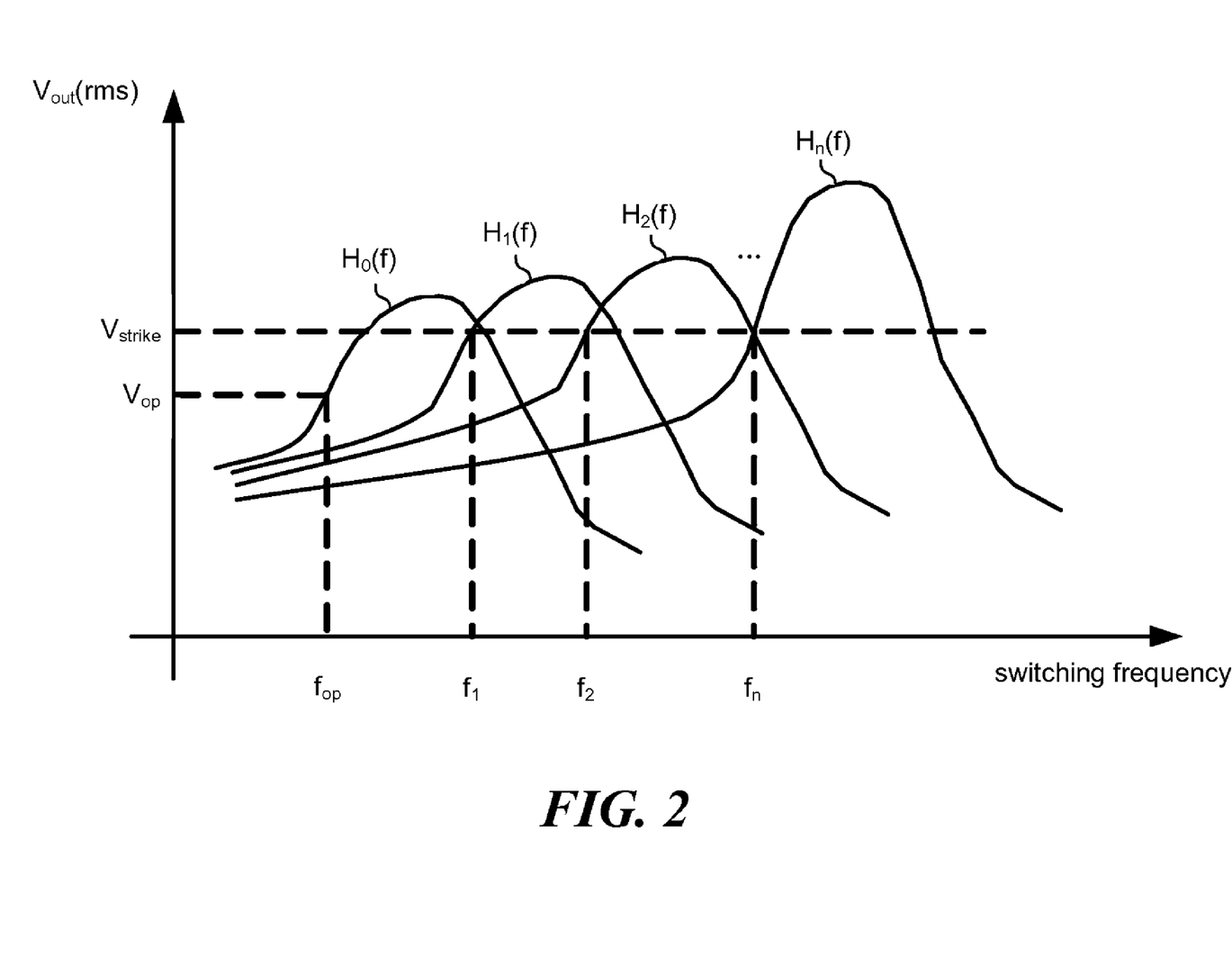
FIG. 2 illustrates the output voltage of the driving apparatus shown in FIG. 1 under different open lamp conditions.

In FIG. 1, the ballast capacitors and discharge lamps constitute the load 105 of the driving apparatus. The load characteristic of the driving apparatus is quite different from that of a conventional driving apparatus without a capacitor balance. In a conventional driving apparatus without a capacitor balance, under a certain switching frequency, the output voltage of the driving apparatus will increase under open lamp condition. The more open lamps there are, the larger the output voltage. However, in the driving apparatus as shown in FIG. 1, under certain switching frequencies, the output voltage of the driving apparatus will decrease under an open lamp condition. The more open lamps there are, the smaller the output voltage. FIG. 2 illustrates the output voltage of the driving apparatus shown in FIG. 1 under different open lamp conditions, wherein $H_0(f)$ is the curve in normal operation, $H_1(f)$ is the curve with one open lamp, $H_2(f)$ is the curve with two open lamps, . . . , and $H_n(f)$ is the curve with n open lamps. The output voltage $V_{out}$ will decrease under open lamp condition and won't be high enough to ignite the lamp. Under certain switching frequencies, the output voltage $V_{out}$ will decrease along with the increase of the number of the open lamps.

There are two prior open lamp protection methods. One is shutting down the driving apparatus once the open lamp condition is detected. This method cannot ignite the lamp again when the lamp is extinct. The other is setting the switching frequency of the driving apparatus to a predetermined frequency that is larger than the operation frequency (the switching frequency in normal operation), so as to increase the output voltage. But in the apparatus for driving multiple parallel discharge lamps with capacitor balance, since the load characteristics with different numbers of open lamps are different, the predetermined frequency is hard to be configured to fulfill all possible conditions. As shown in FIG. 2, for example, if the switching frequency is increased from $f_{op}$ (the operation frequency) to $f_1$ under open lamp condition, the output voltage $V_{out}$ will be the striking voltage $V_{strike}$ and high enough to ignite the lamp again if there is only one open lamp. But if there are two or more open lamps, the output voltage $V_{out}$ will become much smaller than the striking voltage $V_{strike}$.

BRIEF DESCRIPTION OF THE DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 3:
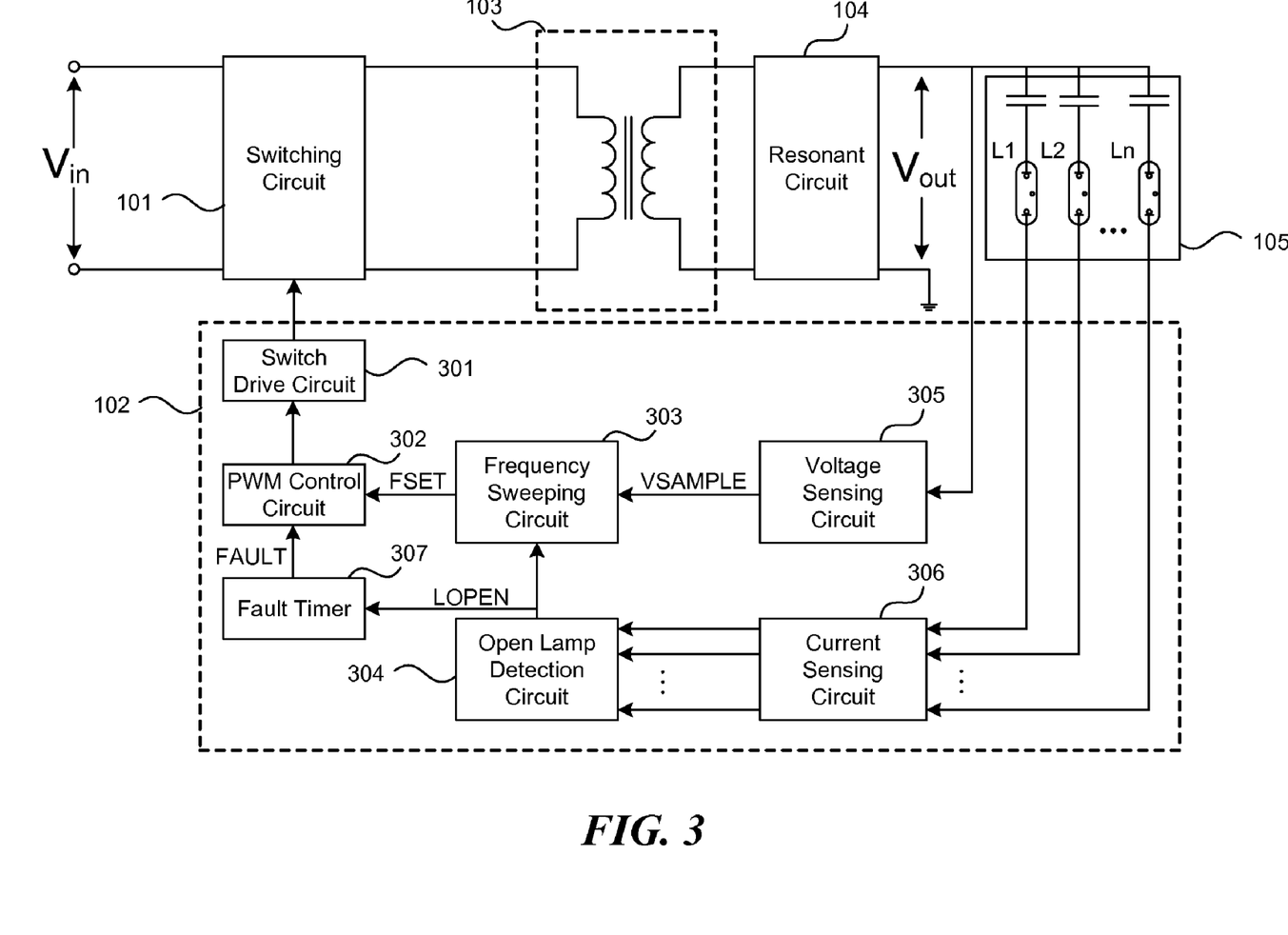
FIG. 3 is a block diagram of the apparatus for driving multiple parallel discharge lamps, in accordance with one embodiment of the present disclosure.

FIG. 3 is a block diagram of the apparatus for driving multiple parallel discharge lamps, in accordance with one embodiment of the present disclosure, comprising a switching circuit 101, a control circuit 102, a transformer 103, a resonant circuit 104 and a load 105. The load 105 comprises multiple parallel branches, each of which comprises one discharge lamp and one ballast capacitor serially connected to the discharge lamp. The switching circuit 101 comprises at least one switch, which generates a first AC signal through the on and off of the at least one switch. The control circuit 102 is electrically coupled to the switching circuit 101 and the load 105, and operates to sense the operation parameters of the load 105 to control the on and off of the at least one switch. The transformer 103 is electrically coupled between the switching circuit 101 and the resonant circuit 104. The primary winding of the transformer 103 receives the first AC signal, and a second AC signal is generated across the secondary winding of the transformer 103. The transformer 103 may comprise multiple primary and secondary windings. The resonant circuit 104 is electrically coupled between the secondary winding of the transformer 103 and the load 105, receives the second AC signal and generates an output voltage $V_{out}$ to drive the load 105. The resonant circuit 104 generally comprises a resonant inductance and a resonant capacitance. The resonant inductance may be a free inductance, or composed of the leakage inductance and/or the excitation inductance of the transformer. The resonant capacitance may be a free capacitance, or composed of the distributed and parasitic capacitance of the discharge lamp. The load 105 is electrically coupled to the resonant circuit 104 and the control circuit 102, receives the output voltage $V_{out}$ and provides its operation parameters to the control circuit 102. In one embodiment, the resonant circuit 104 is electrically coupled between the switching circuit 101 and the transformer 103, while the load 105 is electrically coupled to the transformer 103 and the control circuit 102.

The control circuit 102 comprises a switch drive circuit 301, a PWM (pulse width modulation) control circuit 302, a frequency sweeping circuit 303, an open lamp detection circuit 304, a voltage sensing circuit 305, a current sensing circuit 306 and a fault timer 307. The voltage sensing circuit 305 is electrically coupled to the load 105 and the frequency sweeping circuit 303, senses the output voltage $V_{out}$ and generates a voltage sensing signal VSAMPLE representative of it. The current sensing circuit 306 is electrically coupled to the load 105 and the open lamp detection circuit 304, senses the current flowing through each discharge lamp, and generates current sensing signals representative of them. The open lamp detection circuit 304 is electrically coupled to the current sensing circuit 306, the frequency sweeping circuit 303 and the fault timer 307, receives the current sensing signals, detects whether the open lamp condition exists based on them, and generates an open lamp signal LOPEN. If the open lamp condition exists, the open lamp signal LOPEN is valid, else, it is invalid. The frequency sweeping circuit 303 is electrically coupled to the PWM control circuit 303, the open lamp detection circuit 304 and the voltage sensing circuit 305, receives the voltage sensing signal VSAMPLE and the open lamp signal LOPEN, and generates a frequency sweeping signal FEST accordingly. When the open lamp signal LOPEN is valid, the frequency sweeping signal FEST will be adjusted to increase the switching frequency if the voltage sensing signal VSAMPLE is less than a predetermined threshold, which means the output voltage $V_{out}$ is less than the striking voltage $V_{strike}$, and will be held to hold the switching frequency if the voltage sensing signal VSAMPLE is larger than or equal to the predetermined threshold. When the open lamp signal LOPEN is invalid, the frequency sweeping signal FEST will be adjusted to resume the switching frequency to the operation frequency. The fault timer 307 is electrically coupled to the PWM control circuit 302 and the open lamp detection circuit 304, receives the open lamp signal LOPEN, and generates a fault signal FAULT accordingly. The fault timer is started once the open lamp signal LOPEN is valid, and cleared when the open lamp signal LOPEN is invalid. If a predetermined time $t_{failure}$ is reached, the fault signal FAULT will be valid to let the PWM control circuit 302 shut down the driving apparatus, else, it is invalid. The PWM control circuit 302 is electrically coupled to the switch drive circuit 301, the frequency sweeping circuit 303 and the fault timer 307, receives the frequency sweeping signal FEST and the fault signal FAULT, generates control signals to control the at least one switch, adjusts the switching frequency according to the frequency sweeping signal FEST, and shuts down the driving apparatus when the fault signal FAULT is valid. The PWM control circuit 302 may also adjust the duty cycle of the control signals according to the operation parameters of the load 105, such as the lamp current, the output voltage $V_{out}$, or the lamp power. The switch drive circuit 301 is electrically coupled to the PWM control circuit 302 and the switching circuit 101, receives the control signals, and generates switch drive signals accordingly to drive the at least one switch.

Once the open lamp condition is detected according to the current sensing signals, the open lamp signal LOPEN is valid, and the fault timer is started. The frequency sweeping signal FEST is adjusted, and the switching frequency is increased accordingly. The increase of the switching frequency causes the output voltage $V_{out}$ as well as the voltage sensing signal VSAMPLE to increase. When the output voltage $V_{out}$ reaches the striking voltage $V_{strike}$, causing the voltage sensing signal VSAMPLE to be equal to the predetermined threshold, the frequency sweeping signal FEST as well as the switching frequency is held. If all the discharge lamps are ignited, the open lamp signal LOPEN is invalid, the fault timer will be cleared, and the frequency sweeping signal FEST will be adjusted to resume the switching frequency to the operation frequency. If the predetermined time $t_{failure}$ is reached, the fault signal FAULT will be valid, and the entire driving apparatus will be shut down.

The operation principle of the driving apparatus shown in FIG. 3 will be introduced below referring to FIG. 2.

In normal operation, the open lamp signal LOPEN is invalid, and the switching frequency is the operation frequency $f_{op}$. When one discharge lamp is open, the open lamp signal LOPEN is valid, the switching frequency begins to increase. When the switching frequency is increased to $f_1$, the output voltage $V_{out}$ reaches the striking voltage $V_{strike}$, the switching frequency is held. If all the discharge lamps are ignited, the open lamp signal LOPEN is invalid, the switching frequency is resumed to the operation frequency $f_{op}$ and the output voltage $V_{out}$ is the operation voltage $V_{op}$.

Similarly, when n discharge lamps are all open, the open lamp signal LOPEN is valid, the switching frequency begin to increase. When the switching frequency is increased to $f_n$, the output voltage $V_{out}$ reaches the striking voltage $V_{strike}$, the switching frequency is held. If all the discharge lamps are ignited, the open lamp signal LOPEN is invalid, the switching frequency is resumed to the operation frequency $f_{op}$ and the output voltage $V_{out}$ is the operation voltage $V_{op}$.

Once the open lamp condition is detected, the driving apparatus starts to increase its switching frequency, until its output voltage $V_{out}$ reaches the striking voltage $V_{strike}$, or all the discharge lamps are ignited again, or the predetermined time $t_{failure}$ is reached to shut down the driving apparatus. The driving apparatus shown in FIG. 3 can adjust its switching frequency automatically according to the load condition, so as to well protect itself.

Figure 4:
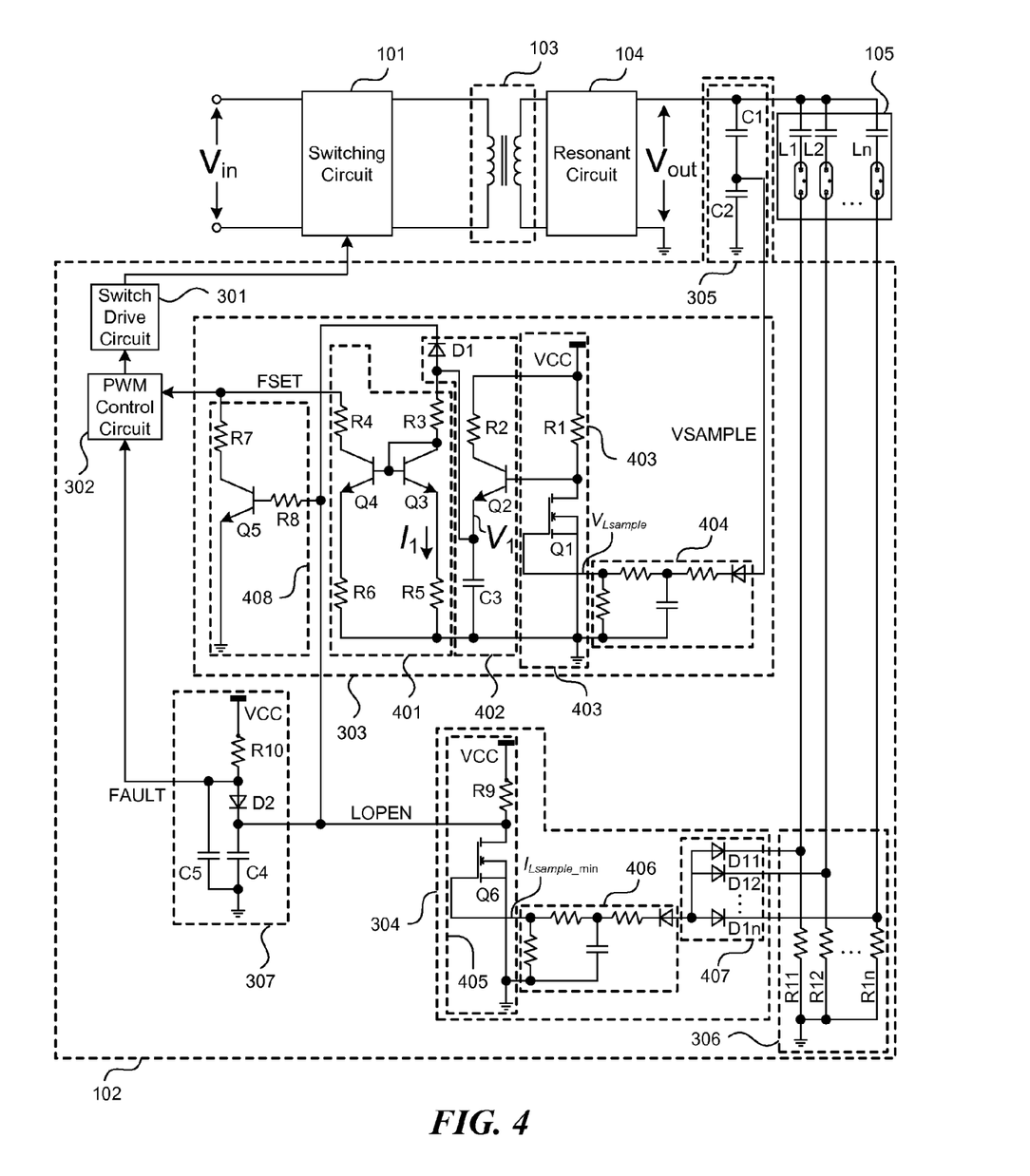
FIG. 4 illustrates an apparatus for driving multiple parallel discharge lamps, in accordance with one embodiment of the present disclosure.

FIG. 4 illustrates an apparatus for driving multiple parallel discharge lamps, in accordance with one embodiment of the present disclosure. The voltage sensing circuit 305 is a capacitor divider, comprises capacitors C1 and C2. The voltage sensing circuit 305 may also be a resistor divider. The current sensing circuit 306 comprises n sensing resistors R11-R1n, each of which is electrically connected between the corresponding discharge lamp and the ground.

The open lamp detection circuit 304 comprises a minimum current detection circuit 407, a current rectifier 406 and a current comparison circuit 405. The minimum current detection circuit 407 is electrically coupled to the current sensing circuit 306 and the current rectifier 406, comprises n diodes D11-D1n. The cathode of the diodes are electrically connected to the sensing resistors to receive the current sensing signals, while the anode are electrically connected together to output the minimum current sensing signal to the current rectifier 406 (the forward voltage of the diodes are neglected). Under open lamp condition, there is no current flowing through the open lamp, so the minimum voltage sensing signal is zero.

The current rectifier 406 is electrically coupled to the minimum current detection circuit 407 and the current comparison circuit 405, receives the minimum current sensing signal and generates a rectified minimum current sensing signal $I_{Lsample\_min}$.

The current comparison circuit 405 is electrically coupled to the current rectifier 406, the frequency sweeping circuit 303 and the fault timer 307, compares the rectified minimum current sensing signal $I_{Lsample\_min}$ with a first threshold $V_{th1}$, and outputs the open lamp signal LOPEN. If $I_{Lsample\_min} < V_{th1}$, the open lamp signal LOPEN is valid, else, it is invalid. In one embodiment, the current comparison circuit 405 comprises a NMOS (n-type metal oxide semiconductor field effect transistor) Q6 and a resistor R9. One terminal of the resistor R9 receives a power supply voltage $V_{cc}$, while the other terminal is electrically connected to the drain of the NMOS Q6, the frequency sweeping circuit 303 and the fault timer 307 to output the open lamp signal LOPEN. The source of the NMOS Q6 is grounded, while the gate is electrically connected to the current rectifier 406 to receive the rectified minimum current sensing signal $I_{Lsample\_min}$. When the rectified minimum current sensing signal $I_{Lsample\_min}$ is larger than or equal to the on threshold of the NMOS Q6, the NMOS Q6 is turned on, the open lamp signal LOPEN is grounded and invalid. When the rectified minimum current sensing signal $I_{Lsample\_min}$ is smaller than the on threshold of the NMOS Q6, the NMOS Q6 is turned off, the open lamp signal LOPEN is high level and valid. The current comparison circuit 405 may also be realized by a comparator.

Generally, a voltage is used to set the switching frequency through adjusting the charge/discharge current of an oscillation circuit or controlling a VCO (voltage controlled oscillator). The driving apparatus shown in FIG. 4 adjusts the switching frequency through adjusting the source current from a frequency set pin which is the charge current of an oscillation circuit. The frequency sweeping signal FEST is the source current from the frequency set pin. The larger the source current, the higher the switching frequency.

The frequency sweeping circuit 303 comprises a voltage rectifier 404, a voltage comparison circuit 403, a voltage adjusting circuit 402 and a current tracking circuit 401. The voltage rectifier 404 is electrically coupled to the voltage sensing circuit 305 and the voltage comparison circuit 403, receives the voltage sensing signal VSAMPLE and generates a rectified voltage sensing signal $V_{Lsample}$.

The voltage comparison circuit 403 is electrically coupled to the voltage rectifier 404 and the voltage adjusting circuit 402, receives the rectified voltage sensing signal $V_{Lsample}$, compares it with a second threshold $V_{th2}$, and generates a voltage comparison signal VCOMP accordingly. If $V_{Lsample} < V_{ref2}$, the voltage comparison signal VCOMP is valid, else, it is invalid. In one embodiment, the voltage comparison circuit 403 comprises a NMOS Q1 and a resistor R1. One terminal of the resistor R1 receives the power supply voltage $V_{cc}$, while the other terminal is electrically connected the drain of the NOMS Q1 and the voltage adjusting circuit 402 to output the voltage comparison signal VCOMP. The source of the NMOS Q1 is grounded, while the gate is electrically connected to the voltage rectifier 404 to receive the rectified voltage sensing signal $V_{Lsample}$. When the rectified voltage sensing signal $V_{Lsample}$ is larger than or equal to the on threshold of the NMOS Q1, the NMOS Q1 is turned on, the voltage comparison signal VCOMP is grounded and invalid. When the rectified voltage sensing signal $V_{Lsample}$ is smaller than the on threshold of the NMOS Q1, the NMOS Q1 is turned off, the voltage comparison signal VCOMP is high level and valid. The voltage comparison circuit 403 may also be realized by a comparator.

The voltage adjusting circuit 402 is electrically coupled to the voltage comparison circuit 403, the current tracking circuit 401 and the open lamp detection circuit 304, receives the voltage comparison signal VCOMP and the open lamp signal LOPEN, and adjust a voltage $V_1$ accordingly. If the open lamp signal LOPEN is invalid, the voltage $V_1$ is set to be zero. If the open lamp signal LOPEN is valid, the voltage $V_1$ is increased when the voltage comparison signal VCOMP is valid, and held when the voltage comparison signal VCOMP is invalid. In one embodiment, the voltage adjusting circuit 402 comprises a resistor R2, a BJT (bipolar junction transistor) Q2, a capacitor C3 and a diode D1, and the voltage $V_1$ is the voltage across the capacitor C3. One terminal of the resistor R2 receives the power supply voltage $V_{cc}$, while the other terminal is electrically connected to the collector of the BJT Q2. The base of the BJT Q2 is electrically connected to the voltage comparison circuit 403 to receive the voltage comparison signal VCOMP, while the emitter is electrically connected to one terminal of the capacitor C3, the anode of the diode D1 and the current tracking circuit 401. The other terminal of the capacitor C3 is grounded, and the cathode of the diode D1 is electrically connected to the open lamp detection circuit 304 to receive the open lamp signal LOPEN. If the open lamp signal LOPEN is invalid (low level), the diode D1 is turned on, the capacitor C3 is quickly discharged through the diode D1 and the NMOS Q6, so the voltage $V_1$ is zero. If the open lamp signal LOPEN is valid (high level), the diode D1 is turned off, when the voltage comparison signal VCOMP is valid (high level), the BJT Q2 is turned on, the capacitor C3 is charged by the power supply voltage $V_{cc}$ through the resistor R2, so the voltage $V_1$ is increased. When the open lamp signal LOPEN is valid (high level) and the voltage comparison signal VCOMP is invalid (low level), both the diode D1 and the BJT Q2 are turned off, so the voltage $V_1$ is held.

The current tracking circuit 401 is electrically coupled to the voltage adjusting circuit 402 and the PWM control circuit 302, receives the voltage $V_1$, generates a current $I_1$ according to the voltage $V_1$, and outputs a frequency sweeping signal FEST. In one embodiment, the current tracking circuit 401 is realized by a current mirror circuit comprising BJTs Q3, Q4 and resistors R3-R6. One terminal of the resistor R3 is electrically connected to the voltage adjusting circuit 402 to receive the voltage $V_1$, while the other terminal is electrically connected to the base and collector of the BJT Q3 and the base of the BJT Q4. The resistor R5 is electrically connected between the emitter of the BJT Q3 and the ground, and the resistor R6 is electrically connected between the emitter of the BJT Q4 and the ground. The collector of the BJT Q4 is electrically connected to one terminal of the resistor R4, and the other terminal of the resistor R4 is electrically connected to the PWM control circuit 302 to output the frequency sweeping signal FEST. The frequency sweeping signal FEST is the current flowing through the resistor R4, and the current $I_1$ is the current flowing through the resistor R3. The proportion between the frequency sweeping signal FEST and the current $I_1$ is determined by the resistors R5 and R6.

The frequency sweeping circuit 303 may further comprise a frequency hopping circuit 408 to speed up the increase of the output voltage $V_{out}$. The frequency hopping circuit 408 is electrically coupled to the PWM control circuit 302, the open lamp detection circuit 304 and the current tracking circuit 401, directly sets the frequency sweeping signal FEST to a predetermined value once the open lamp condition is detected. In one embodiment, the frequency hopping circuit 408 comprises resistors R7, R8, and a BJT Q5. One terminal of the resistor R8 is electrically connected to the open lamp detection circuit 304 to receive the open lamp signal LOPEN, while the other terminal is electrically connected to the base of the BJT Q5. The emitter of the BJT Q5 is grounded, while the collector is electrically connected to one terminal of the resistor R7. The other terminal of the resistor R7 is electrically connected to the PWM control circuit 30 and the current tracking circuit 401 to output the frequency sweeping signal FEST together with the current tracking circuit 401. When the open lamp signal LOPEN is valid (high level), the BJT Q5 is turned on, and the frequency sweeping signal FEST is the sum of the current flowing through the resistors R7 and R4.

In one embodiment, the fault timer 307 comprises a resistor R10, a diode D2, capacitors C4 and C5. One terminal of the resistor R10 receives the power supply voltage $V_{cc}$, while the other terminal is electrically connected to the anode of the diode D2, one terminal of the capacitor C5 and the PWM control circuit 302 to output the fault signal FAULT. The other terminal of the capacitor C5 is grounded. The cathode of the diode D2 is electrically connected to one terminal of the capacitor C4 and the open lamp detection circuit 304 to receive the open lamp signal LOPEN, and the other terminal of the capacitor C4 is grounded. When the open lamp signal LOPEN is invalid (low level), the diode D2 is turned on, and the voltage of the fault signal FAULT is the forward voltage of the diode D2 (such as 0.75V), the fault signal FAULT is invalid. When the open lamp signal LOPEN is valid (high level), the diode D2 is turned off, the capacitor C5 is charged by the power supply voltage $V_{cc}$ through the resistor R10. When the voltage across the capacitor C5, namely, the voltage of the fault signal FAULT is increased to a predetermined value (such as 1.2V), which means the predetermined time $t_{failure}$ is reached, the fault signal FAULT is valid, the driving apparatus will be shut down by the PWM control circuit 302. The predetermined time $t_{failure}$ is determined by the power supply voltage $V_{cc}$, the resistor R10, the capacitor C5 and the forward voltage of the diode D2. The fault timer 307 may also be realized by a digital timer circuit.

The driving apparatus shown in FIG. 4 may be partially or totally integrated in a single package, and the topology of the switching apparatus 101 may be half-bridge, full-bridge, push-pull, Nu-pulse or other DC/AC topologies.

Figure 5:
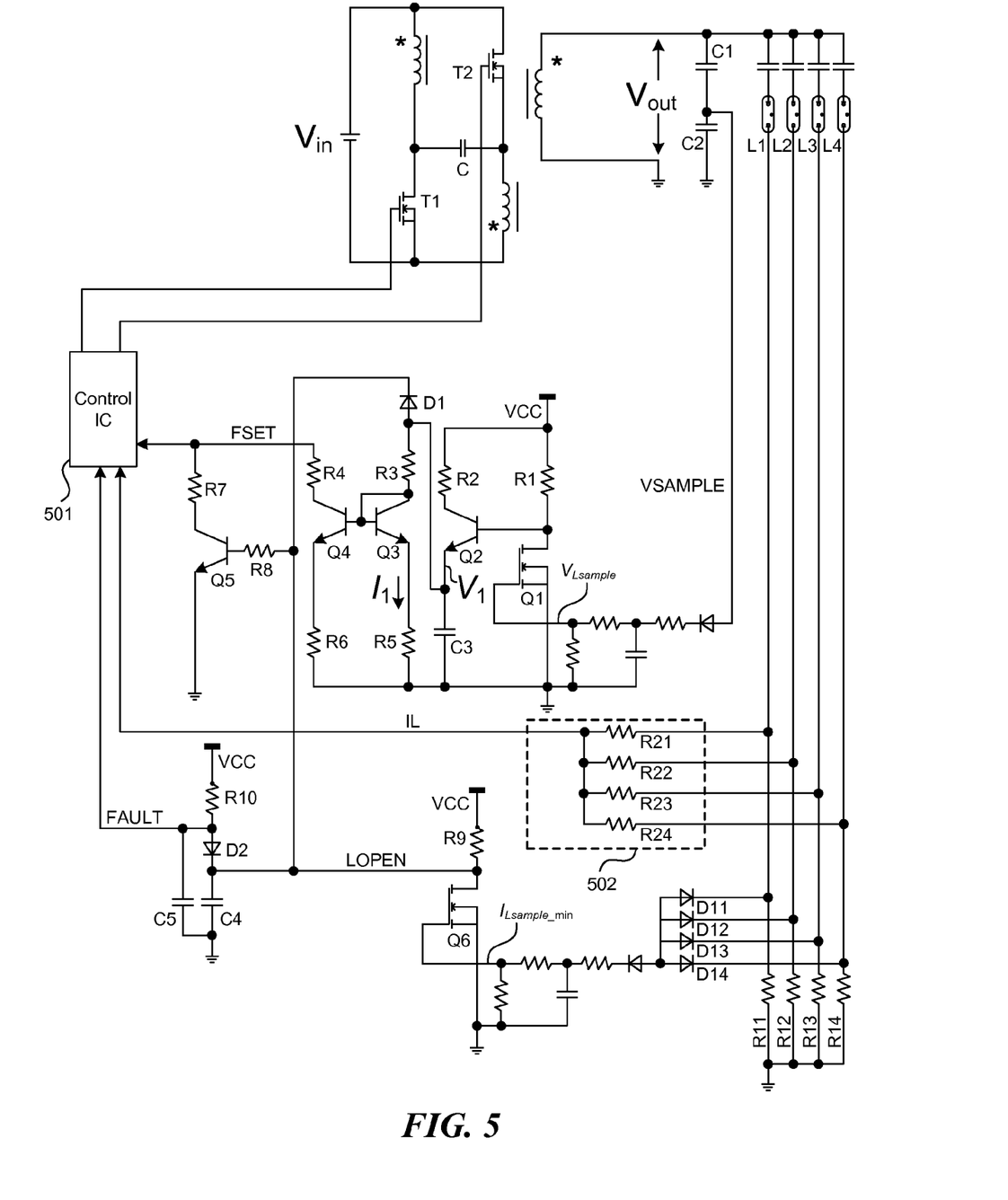
FIG. 5 illustrates an apparatus for driving multiple parallel discharge lamps, in accordance with another embodiment of the present disclosure.

FIG. 5 illustrates an apparatus for driving multiple parallel discharge lamps, in accordance with another embodiment of the present disclosure, wherein the topology of the switching apparatus is Nu-pulse, and the PWM control circuit and the drive circuit are integrated to form a control integrated circuit 501. It further comprises a total current sensing circuit 502 which comprises resistors R21-R24. One terminal of the resistors are electrically connected to the discharge lamps, while the other terminal are electrically connected together to output the weighted sum IL of the current flowing through the discharge lamps. The weighted sum IL is sent to the control integrated circuit 501 to control the duty cycle of the control signals, so as to provide stable lamp current.

Figure 6:
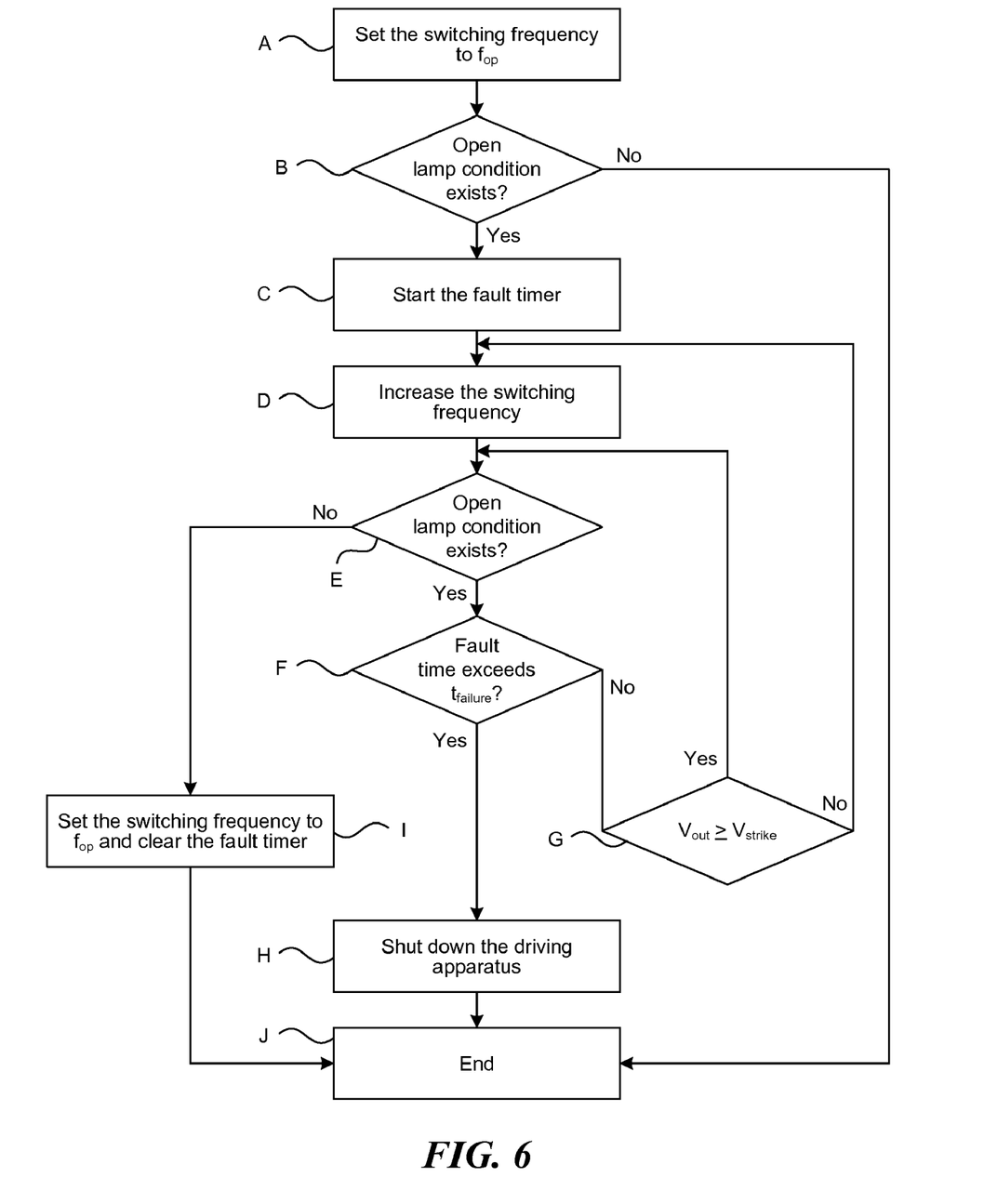
FIG. 6 is a flow chart of the method for driving multiple parallel discharge lamps, in accordance with one embodiment of the present disclosure.

FIG. 6 is a flow chart of the method for driving multiple parallel discharge lamps, in accordance with one embodiment of the present disclosure, comprising steps A-J.

Step A, setting the switching frequency of the driving apparatus to an operation frequency $f_{op}$.

Step B, judging whether the open lamp condition exists, if yes, go to step C, else, go to step J.

Step C, starting a fault timer.

Step D, increasing the switching frequency.

Step E, detecting whether open lamp condition exists, if yes, go to step F, else, go to step I.

Step F, detecting whether the fault time exceeds a predetermined time $t_{failure}$, if yes, go to step H, else, go to step G.

Step G, detecting whether the output voltage $V_{out}$ of the driving apparatus is larger than or equal to a striking voltage $V_{strike}$, if yes, go to step E, else, go to step D. Generally, this judgment is realized by comparing a rectified sensing voltage with a threshold.

Step H, shutting down the driving apparatus.

Step I, setting the switching frequency of the driving apparatus to the operation frequency $f_{op}$, and clear the fault timer.

Step J, end.

Step D may further comprises frequency hopping, which sets the switching frequency to a frequency $f_{jump}$ once the open lamp condition is detected.

Many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. An apparatus for driving multiple discharge lamps, comprising
   a switching circuit having at least one switch;
   an open lamp detection circuit, electrically coupled to said discharge lamps, detecting whether the open lamp condition exists and generating an open lamp signal;
   a frequency sweeping circuit, electrically coupled to said open lamp detection circuit, that increases the switching frequency of the at least one switch when the open lamp condition is detected; and
   a current sensing circuit, electrically coupled to said multiple discharge lamps, sensing the current flowing through said discharge lamps and generating current sensing signals representative of them, wherein said open lamp detection circuit is electrically coupled to said current sensing circuit to receive said current sensing signals and detect whether the open lamp condition exists based on them, wherein said discharge lamps are in parallel, and a capacitor is serially connected to each discharge lamp, wherein the switching frequency is held by said frequency sweeping circuit when an output voltage of the driving apparatus reaches a striking voltage, wherein said open lamp detection circuit comprises:
   a minimum current detection circuit, electrically coupled to said current sensing circuit, receiving said current sensing signals and generating a minimum current sensing signal;
   a current rectifier, electrically coupled to said minimum current detection circuit, receiving said minimum current sensing signal and generating a rectified minimum current sensing signal;
   a current comparison circuit, electrically coupled to said current rectifier, comparing said rectified minimum current sensing signal with a first threshold, and generating said open lamp signal.

2. The apparatus of claim 1, wherein said current sensing circuit comprises multiple sensing resistors, each of which is serially connected between the corresponding discharge lamp and the ground.

3. The apparatus of claim 1, wherein said minimum current detection circuit comprises multiple diodes, the cathode of said diodes are electrically connected to said current sensing circuit to receive said current sensing signals, and the anode are electrically connected together to output the minimum current sensing signal.

4. An apparatus for driving multiple discharge lamps, comprising:
   a switching circuit having at least one switch;
   an open lamp detection circuit, electrically coupled to said discharge lamps, detecting whether the open lamp condition exists and generating an open lamp signal;
   a frequency sweeping circuit, electrically coupled to said open lamp detection circuit, that increases the switching frequency of the at least one switch when the open lamp condition is detected, wherein the switching frequency is held by said frequency sweeping circuit when an output voltage of the driving apparatus reaches a striking voltage; and
   a voltage sensing circuit, sensing said output voltage and generating a voltage sensing signal representative of said output voltage,
   wherein said discharge lamps are in parallel, and a capacitor is serially connected to each discharge lamp, and
   wherein said frequency sweeping circuit comprises:
      a voltage rectifier, electrically coupled to said voltage sensing circuit, receiving said voltage sensing signal and generating a rectified voltage sensing signal;
      a voltage comparison circuit, electrically coupled to said voltage rectifier, comparing said rectified voltage sensing signal with a second threshold, and generating a voltage comparison signal;
      a voltage adjusting circuit, electrically coupled to said voltage comparison circuit and said open lamp detection circuit, receiving said voltage comparison signal and said open lamp signal, and generating a first voltage based on them;
      a current tracking circuit, electrically coupled to said voltage adjusting circuit, receiving said first voltage, and generating a frequency sweeping signal based on said first voltage to control the switching frequency.

5. The apparatus of claim 4, wherein said voltage comparison circuit comprises:
   a resistor, one terminal of said resistor receives a power supply voltage;
   a NMOS, the drain of said NMOS is electrically connected to the other terminal of said resistor and said voltage adjusting circuit to output said voltage comparison signal, the source of said NMOS is grounded, and the gate of said NMOS is electrically connected to said voltage rectifier to said rectified voltage sensing signal.

6. The apparatus of claim 4, wherein said voltage adjusting circuit comprises:
   a resistor, one terminal of said resistor receives a power supply voltage;
   a BJT, the base of said BJT is electrically connected to said voltage comparison circuit to receive said voltage comparison signal, the collector of said BJT is electrically connected to the other terminal of said resistor;
   a diode, the cathode of said diode is electrically connected to said open lamp detection circuit to receive said open lamp detection signal;
   a capacitor, one terminal of said capacitor is electrically connected to the emitter of said BJT and the anode of said diode, the other terminal of said capacitor is grounded;
   wherein said first voltage is the voltage across said capacitor.

7. The apparatus of claim 4, wherein said current tracking circuit comprises a current mirror circuit.

8. The apparatus of claim 4, wherein said frequency sweeping circuit further comprises a frequency hopping circuit, electrically couple to said open lamp detection circuit and said current tracking circuit, setting the switching frequency to a predetermined frequency once the open lamp condition is detected.

9. The apparatus of claim 8, wherein said frequency hopping circuit comprises:
   a first resistor, one terminal of said first resistor is electrically connected to said current tracking circuit;
   a second resistor, one terminal of said second resistor is electrically connected to said open lamp detection circuit to receive said open lamp signal;
   a BJT, the base of said BJT is electrically connected to the other terminal of said second resistor, the collector of said BJT is electrically connected to the other terminal of said first resistor, and the emitter of said BJT is grounded.

* * * * *